(12) United States Patent
Lambert et al.

(10) Patent No.: US 10,664,845 B1
(45) Date of Patent: May 26, 2020

(54) SYSTEMS AND METHODS FOR USE IN IMPLEMENTING ACCOUNT CONTROLS

(71) Applicant: MASTERCARD INTERNATIONAL INCORPORATED, Purchase, NY (US)

(72) Inventors: Andrew Lambert, Fairfield, CT (US); Jason Jay Lacoss-Arnold, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 810 days.

(21) Appl. No.: 14/966,107

(22) Filed: Dec. 11, 2015

(51) Int. Cl.
| G06Q 30/00 | (2012.01) |
| A61B 5/00 | (2006.01) |
| G06Q 20/00 | (2012.01) |
| G06Q 20/40 | (2012.01) |
| G06Q 40/06 | (2012.01) |

(52) U.S. Cl.
CPC .......... *G06Q 20/405* (2013.01); *G06Q 40/06* (2013.01)

(58) Field of Classification Search
CPC ...... G06Q 30/00; G06Q 40/00; G06Q 20/102; G06Q 20/3278; G06F 19/00; A61B 5/0006
USPC ..................................................... 705/35, 36
See application file for complete search history.

(56) References Cited

U.S. PATENT DOCUMENTS

| 8,126,791 | B2 | 2/2012 | Chisholm | |
| 8,417,584 | B2* | 4/2013 | Ross | G06Q 40/00 |
| | | | | 705/26.1 |
| 9,545,230 | B2* | 1/2017 | Sadhu | A61B 5/0006 |
| 2007/0299774 | A1* | 12/2007 | Eaves | G06Q 20/102 |
| | | | | 705/40 |
| 2016/0132880 | A1* | 5/2016 | O'Regan | G06Q 20/3278 |
| | | | | 705/44 |

* cited by examiner

*Primary Examiner* — Clifford B Madamba
(74) *Attorney, Agent, or Firm* — Harness, Dickey & Pierce, P.L.C.

(57) ABSTRACT

Systems and methods are provided for use in implanting account controls based on conditional states of users associated with the accounts. One exemplary method general includes receiving, by a computing device, status data for a user where the status data is indicative of a current conditional state of the user. The method also includes accessing, by the computing device, at least one account control rule for an account associated with the user, where the at least one account control rule associated with a conditional state, and activating, by the computing device, the at least one account control rule when the current conditional state of the use is the same as the conditional state associated with the at least one account control rule.

14 Claims, 3 Drawing Sheets

SYSTEMS AND METHODS FOR USE IN IMPLEMENTING ACCOUNT CONTROLS

FIELD

The present disclosure generally relates to systems and methods for use in implementing controls for accounts. In particular, the present disclosure relates to activating, altering or otherwise modifying account controls based on conditional states of users associated with the accounts.

BACKGROUND

This section provides background information related to the present disclosure which is not necessarily prior art.

Merchants offer products such as goods and services for sale to consumers. The products may be purchased through a variety of different means, including, for example, through payment accounts. The payment accounts are typically issued to the consumers by banks or other financial institutions, called issuers. Occasionally, the payment accounts are used by individuals not associated with the payment accounts to make unauthorized purchases. The issuers provide a variety of controls for the payment accounts to help limit or minimize the risks associated with such unauthorized use of the payment accounts. For example, fraud protection rules may be applied to payment accounts to limit cumulative amounts of purchases to the payment accounts over given periods, or to require particular user authentications such as signatures, PINs, or biometrics, etc.

Separately, many consumers have communication devices such as mobile phones, tablets, laptops, etc. Many consumers also have devices that specifically monitor their daily activities and movements such as, for example, number of steps taken in a day, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers (broadly, users) often carry portable communication devices for use in their daily activities. Many consumers further use the communication devices to obtain various feedback (broadly, data) regarding their activities. For example, mobile phones may be used to estimate steps taken in a day by consumers, or their travel speed. Other devices (e.g., wearable devices, etc.) may be used by consumers to gather even more data, such as heart rate, respiratory rate, temperature, and data relating to sleep patterns. Uniquely, the systems and methods herein utilize this data, when provided by the consumers, to implement certain account controls for accounts associated with the consumers. In particular, the systems and methods utilize the data to determine current states of the consumers, and then implement or modify particular account rules based on the states, as appropriate. In so doing, certain transactions to the accounts, or other actions involving the accounts, inconsistent with the current states of the consumers, may be scrutinized in detail and/or declined as potentially fraudulent.

Figure 1:
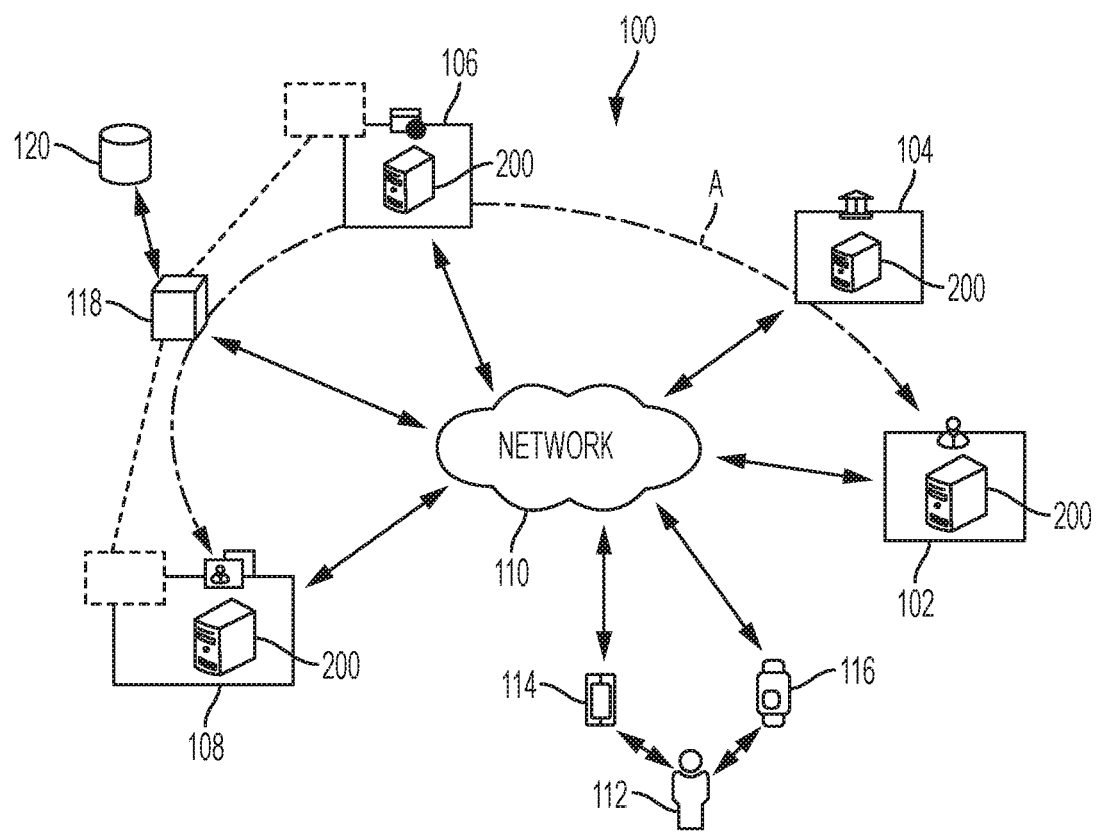
FIG. 1 is a block diagram of an exemplary system of the present disclosure suitable for use in implementing controls for an account associated with a user, based on conditional states of the user.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, receipt of status data from users, processing of transactions, etc.

The system 100 generally includes a merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the merchant 102, the payment network 106, and a consumer 112 (or one of the consumer's communication devices 114, 116), etc.

The merchant 102 is generally associated with products (e.g., goods and/or services, etc.), which are offered for sale and are sold to consumers in the system 100, including consumer 112 (broadly, a user). The merchant 102 may offer the products for sale in physical locations or through web-sites, or through other web-based store fronts, as desired. The consumer 112 may fund transactions with the merchant 102 for one or more of the products via a payment account.

For example, the consumer 112 may initiate a transaction with the merchant 102, for the purchase of a product, by presenting a payment device associated with the consumer's payment account to the merchant 102 (e.g., a credit card, a debit card, a fob, a smartcard, a web-based e-wallet application, etc.). In turn, the merchant 102 submits an authorization request to the acquirer 104 for the transaction, to determine whether the payment account is in good standing and whether there is sufficient funds and/or credit to cover the transaction. The authorization request is transmitted along path A in the system 100, as referenced in FIG. 1. The acquirer 104 communicates the authorization request with the issuer 108, through the payment network 106, such as, for example, through MasterCard®, VISA®, Discover®, American Express®, etc. In turn, if approved, an authorization reply (indicating the approval of the transaction) is transmitted back from the issuer 108 to the merchant 102, along path A, thereby permitting the merchant 102 to complete the transaction. The transaction is later cleared and/or settled by and between the merchant 102, the acquirer 104, and the issuer 108. If declined, however, an authorization reply indicating a decline of the transaction is provided back to the merchant 102, along the path A, thereby permitting the merchant 102 to halt or terminate the transaction.

Transaction data is generated, collected, and stored as part of the above interactions among the merchant 102, the acquirer 104, the payment network 106, the issuer 108, and the consumer 112. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the merchant 102, the acquirer 104 and/or the issuer 108 may store the transaction data, or part thereof, in a data structure, or transaction data may be transmitted between parts of system 100 as used or needed. The transaction data may include, for example, payment account numbers, amounts of the transactions, merchant IDs, merchant category codes (MCCs), dates/times of the transactions, products purchased and related descriptions or identifiers, etc. It should be appreciated that more or less information related to transactions, as part of either authorization or clearing and/or settling, may be included in transaction records and stored within the system 100, at the merchant 102, the acquirer 104, the payment network 106 and/or the issuer 108.

In various exemplary embodiments, the consumers (e.g., consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions, subsequently for one or more of the different purposes described herein.

With continued reference to FIG. 1, the consumer 112 is associated with the communication devices 114, 116. In this exemplary embodiment, the communication device 114 is a portable communication device, such as, for example, a smartphone, a tablet, a laptop, etc., and the communication device 116 is a wearable device such as, for example, a Fitbit™, a Jawbone™, a Fuelband™, an Apple™ Watch, another smartwatch, etc. The communication devices 114, 116 may each be used to gather status data for the consumer 112 such as, for example, movement and/or pace (e.g., via accelerometers, GPS units, etc.); speed or velocity; location (e.g., via global positioning system (GPS) programs, etc.); voice data including content, tone, inflection, etc.; heart rate, respiratory rate, muscle tension, temperature, blood pressure, brain activity (e.g., via an electroencephalogram, etc.), actigraphy data (relating to a level of activity of the consumer 112), other biological characteristics, etc. (e.g., via one or more sensors positioned in contact with the consumer 112, etc.); etc. With that said, it should be appreciated that the status data gathered by the devices 114, 116 may include any desired data similar to or different from that listed above. In addition, in various embodiments, the communication devices 114, 116 may be configured to utilize the status data, alone or in combination, to determine a conditional state of the consumer 112, for example, a sleeping state, an awake state, a sober state, an exercising state, a moving state (e.g., walking, running, driving, etc., as distinguished by an accelerometer or GPS unit), etc.

In other embodiments, one or more of the communication devices 114, 116 may include other wearable devices such as smart glasses (e.g., Google™ Glass, etc.), sleep masks, etc., or other communication devices in general (wearable or not). In embodiments where one or more of the communication devices 114, 116 includes smart glasses, the devices may be configured to gather status data, or other data, relating to what the consumer 112 is looking at through the device and/or movements made by the consumer that may be used to help identify a conditional state of the user (e.g., visual cues such as does the consumer 112 appear to be off balance, etc.). Here, a presumption may be made that, in order for the consumer 112 to purchase a product, the consumer 112 must be looking at the product or a representation thereof.

The consumer's communication devices 114, 116 also each include, or are associated with, a network-based monitoring application, which includes a unique app identifier or (ID). The communication devices 114, 116 are configured, by the monitoring application, to collect and store the status data for the consumer 112 (e.g., at the communication devices 114, 116; at the web-based monitoring applications associated with the particular one of the devices 114, 116; at another device; etc.). It is not required, however, that status data be collected and/or stored for both devices 114, 116. In some embodiments, for example, consumers may have only a single communication device configured to gather status data for the consumers.

While one merchant 102, one acquirer 104, one payment network 106, one issuer 108, and one consumer 112 are illustrated in FIG. 1, it should be appreciated that any number of these parts (and their associated parts, including third parties) may be included in the system 100, or may be included as one or more parts of systems in other embodiments, consistent with the present disclosure.

Figure 2:
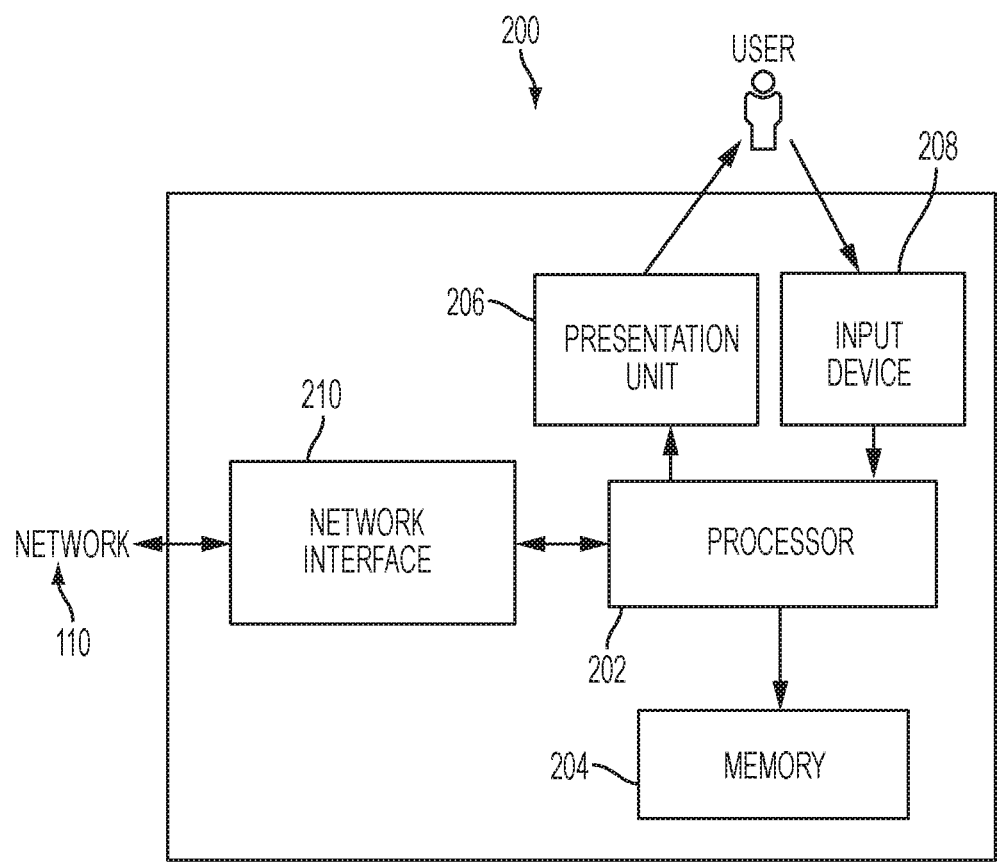
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the merchant 102, the acquirer 104, the payment network 106, and the issuer 108 are illustrated as including, or being implemented in, computing device 200, coupled to the network 110. Further, the computing devices 200 associated with these parts of the system 100, for example, may include a single computing device, or multiple computing devices located in close proximity or distributed over a geographic region, again so long as the computing devices are specifically configured to function as described herein. In addition, the communication devices 114, 116, which are associated with consumer 112, can also each be considered a computing device consistent with computing device 200 for purposes of the description herein.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, consumer profiles, status data, conditional states, account control rules, fraud tracking data, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206 that is coupled to (and in communication with) the processor 202 (however, it should be appreciated that the computing device 200 could include output devices other than the presentation unit 206, etc.). The presentation unit 206 outputs information (e.g., status data and/or conditional states related to consumer 112, transaction data, etc.), visually, for example, to a user of the computing device 200, such as the consumer 112 in the system 100, or users associated with the payment network 106 or issuer 108, etc. It should be further appreciated that various interfaces (e.g., as defined by web-based applications, websites, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices. The computing device 200 also includes an input device 208 that receives inputs from the user (i.e., user inputs) and/or other computing devices such as, for example, status data, payment account inputs, etc. The input device 208 may include a single input device or multiple input devices. The input device 208 is coupled to (and in communication with) the processor 202 and may include, for example, one or more of a keyboard, a pointing device, a mouse, a stylus, a touch sensitive panel (e.g., a touch pad or a touch screen, etc.), a sensor configured to collect status data of the consumer 112 (e.g., heart rate data, respiratory rate data, temperature data, movement data, etc.), a microphone configured to capture voice (or other audible) data, another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the system 100 includes an account control engine 118, which is specifically configured, by computer executable instructions, to perform one or more of the operations described herein.

The account control engine 118 is illustrated as a stand-alone part of the system 100, generally located along path A in the system 100. As such, the account control engine 118 is able to implement the various operations herein. However, the account control engine 118 may be incorporated with, or integrated with, other parts of the system 100 in other embodiments. For example, in some embodiments, as indicated by the dotted lines in FIG. 1, the account control engine 118 may be incorporated with either the payment network 106 or the issuer 108 (e.g., with the computing devices 200 thereof, etc.). In addition, in still other embodiments, the account control engine 118 may be incorporated with one of the communication devices 114, 116. Further, in other embodiments the account control engine 118 may be associated with, or incorporated with, multiple parts of the system (e.g., multiple payment networks, issuers, communication devices, etc.), whereby the account control engine 118 may operate, as described herein, for more than a single consumer and/or payment account. The account control engine 118 may be considered a computing device, consistent with computing device 200.

In particular in the system 100, the account control engine 118 is configured to implement different controls for the consumer's payment account based on a current conditional state of the consumer 112, as determined by the engine 118 from the status data received from the consumer 112. As such, certain ones of the controls are invoked when the account control engine 118 determines the consumer 112 to be in the corresponding one of the conditional states. Particular actions, as dictated by the controls, are then taken or required to be taken (e.g., by the account control engine 118, by the payment network 106, by the issuer 108, etc.) regarding the consumer's payment account. Example conditional states associated with the different controls may include, without limitation, a sleeping state, a moving state, a running state, an exercising state, a driving state, a stressed state, a state of duress, a sobriety state, etc.

As described above, status data is gathered for and received from the consumer 112, at particular times and by permission of the consumer 112, via the communication devices 114, 116 associated with the consumer 112. The communication devices 112, 114 may transmit the status data to the account control engine 118. Or, the account control engine 118 may pull the status data from the web-based monitoring application associated with the particular one of the communication devices 112, 114, as appropriate. In either case, the status data is then used to determine a conditional state of the consumer 112, at the time the status data is gathered. In some embodiments, the account control engine 118 analyzes the status data and determines the conditional state of the consumer 112. However, in other embodiments, one or more of the communication devices 114, 116 may be configured (e.g., via the monitoring applications, via other applications at the communication devices 114, 116, etc.) to analyze the status data and determine the conditional state of the consumer 112, and then transmit the conditional state to the account control engine 118. In still other embodiments, the account control engine 118 may analyze some status data received from the consumer 112 while the communication devices 114, 116 analyze other status data.

In embodiments where the account control engine 118 analyzes the status data received from the consumer 112 and determines the conditional state of the consumer 112, the account control engine 118 may assess the status data by comparing it to various thresholds stored in memory of the engine 118.

In some embodiments, the thresholds may include predefined values associated with different conditional states. Such predefined values may include, for example, standard values for respiratory rates (e.g., a respiratory rate of greater than about 20 breaths per minute indicates an exercising or running state, etc.), heart rates (e.g., a heart rate of less than 60 beats per minute indicates a sleep state, a heart rate of greater than about 100 beats per minute indicates an exercising or running state, etc.), combinations thereof, etc. Alternatively, the predefined values may include calibrated values for the particular consumer 112. For instance, an account control rule for the consumer's payment account may relate to use of the account when the consumer 112 is asleep. As such, the consumer 112 may record a sleeping heart rate and provide it as the predefined value in order for the account control engine 118 to accurately determine when the consumer 112 is asleep, based on status data collected from one or more of the consumer's communication devices 114, 116.

In other embodiments, the thresholds may include thresholds included, by default, in the communication devices 114, 116 or associated with programs thereon.

In still other embodiments, the thresholds may simply include whether status data is being received from the consumer 112, for example, via one of the communication devices 114, 116. Here, receipt of the status data is indicative that the consumer 112 is currently wearing or using the communication devices 114, 116.

With continued reference to FIG. 1, the account control engine 118 is associated with a data structure 120 populated with rules that control transactions to the consumer's payment account (i.e., that effect the various account controls implicated by the consumer's different conditional states). While the data structure 120 is shown as a standalone part of the system 100, it should be appreciated that the data structure 120 may be included in memory (e.g., memory 204, etc.) associated with the account control engine 118, in some embodiments, or in memory associated with other parts of the system 100 (e.g., the payment network 106, the issuer 108, etc.).

The account control rules may be triggered by values of the status data exceeding a threshold, falling beneath a threshold, or entering a range of values (also defined as a threshold). Or, the account control rules may be triggered by simply receiving status data, or not receiving status data. In addition, an account control rule may have more than one threshold and/or may depend on more than one status data value. For instance, an account control rule may be triggered when a consumer's heart rate falls below a certain value and the consumer's temperature is below a certain value (i.e., a low heart rate AND low temperature). Alternatively, an account control rule may be triggered by one of multiple thresholds (e.g., a low heart rate OR a low temperature, etc.). Further, in various embodiments, the account control rules may be triggered by an indicator that the consumer 112 is in a particular conditional state (e.g., independent of the actual status data used to classify the consumer 112 in the particular conditional state, etc.).

In addition, the account control rules may relate to any desired control of the consumer's payment account, when the consumer is determined to be in a particular conditional state. For example, the account control rules may relate to limiting (or suspending) certain transactions to the consumer's payment account (e.g., transactions relating to certain MCCs, certain types of transactions such as online transactions, certain categories of transactions, etc.). Or, the account control rules may relate to activating (or allowing) certain transactions (e.g., that may have been previously disabled, etc.). In one particular example, an account control rule may suspend use of the consumer's payment account when the consumer 112 is sleeping, exercising, or driving. In another particular example, an account control rule may relate to a fraud protection rule that limits cumulative amounts of purchases to the payment account over a given period, or to require a particular user authentication such as a signature, a PIN, or a biometric, etc., when the consumer 112 is in a particular conditional state. In still another example, an account control rule may relate to transmitting a transaction confirmation to the consumer 112, via text message for electronic mail, and requiring a confirmation from the consumer 112 to complete the transaction when the consumer 112 is in a particular conditional state. Moreover, the account control rules may be further conditioned based on aspects of the transactions. For example, recurring bill payments and internet orders may still be allowed to occur while the consumer 112 is asleep or exercising, but brick and mortar transactions would not be allowed. Similarly, transactions at gas pumps may be disallowed while the consumer 112 is jogging, but transactions at coffee shops would still be allowed. This will be described in more detail hereinafter.

The account control rules may also be used to alter account controls based on a time interval after they are triggered. For instance, a rule may be triggered when the consumer 112 removes or disables one of the computing devices 114, 116 that suspends activity on the consumer's payment account for a set time interval (e.g., 10 minutes, 15 minutes, 1 hour, etc.). Alternatively, the triggering of the rule may start a time interval during which no action is taken, but after which the rule is enforced (i.e., enforcement of the rule may be delayed). For example, when the received status data indicates that the consumer 112 has removed or misplaced one of the computing devices 114, 116, a rule may be triggered which waits for a time interval, such as 10 minutes, and then suspends the associated account. Then, when status data is received from the consumer 112 indicating that the consumer 112 is using the computing devices 114, 116 again, within the time interval, the account control rule may be reset and/or not enforced.

Further, the account control rules may affect the consumer's account in other ways, such as, for example, allowing a limited amount of spending on the account and suspending the account after that amount is met or exceeded. As an example, an account control rule may limit spending on the consumer's account to $20 (or another limit) when the consumer 112 is exercising (i.e., when the consumer is in an exercising conditional state). In this way, if the consumer 112 is jogging and drops his/her wallet containing a card associated with the account, an individual who finds the wallet will not be able to fraudulently make large purchases using the consumer's account. As another example, an account control rule may limit spending on the consumer's account to $40 (or another amount) when the consumer 112 is stressed or in a state of duress (e.g., has a high heart rate without accompanying temperature elevation and has a vocal tone indicating duress, etc.) as might occur if the consumer 112 is being mugged. In this way, a transaction is still allowed (e.g., at an ATM, etc.), but only under the particular limit, for example, to preserve the consumer's safety by giving the mugger something but not completely draining the consumer's account.

It should be appreciated that the account control rules included in the data structure 120 may be generated, modified and/or organized by the payment network 106, the issuer 108, and/or the consumer 112, as desired. In addition, enforcement of the account control rules may be performed by the account control engine 118, or by one or more of the payment network 106 and the issuer 108 (e.g., upon receiving an instruction from the account control engine 118, etc.). As previously described, such enforcement may include completely suspending purchases on an account or suspending purchases for only certain types and/or categories of purchases. In some embodiments, for example, even if most purchases have been disabled on the consumer's account, recurring payments and/or purchases which have previously been confirmed may still be allowed. Alternatively, when the consumer's payment account, by default, limits or suspends certain purchases, those purchases may be allowed (or activated) when particular account controls are implemented (e.g., when the consumer 112 is determined to be in a particular conditional state, etc.). For example, when status data received from the consumer 112 indicates that the consumer 112 is exercising (or likely to be exercising), an account control rule may be triggered that prevents purchases from online merchants, purchases of gas at gas stations, or other types of purchases that consumer 112 may not be likely to make while exercising. As another example, when status data received from the consumer 112 indicates that the consumer 112 is sleeping, an account control rule may be triggered that suspends all account transactions. Then, when status data received from the consumer 112 indicates that the consumer 112 has woken up, the account rule may be removed (or an account rule that allows all transactions may be triggered).

It is contemplated that the account control rules will be implemented during authorization and/or authentication of transactions. For example, such rules may be applied at the payment network 106 or at the issuer 108. When applied at the issuer 108, the rules may relate to instructions for the issuer 108 to deny transactions or request additional information from the consumer 112 prior to moving forward with approval. This additional information might be an additional authorization (e.g., an additional cardholder verification method like a biometric check or a PIN, etc.) or might be a request to the consumer 112 via text or email to confirm the transaction. However, in various other embodiments, the account control rules may alternatively (or additionally) be implemented during settlement/clearing of transactions.

Figure 3:
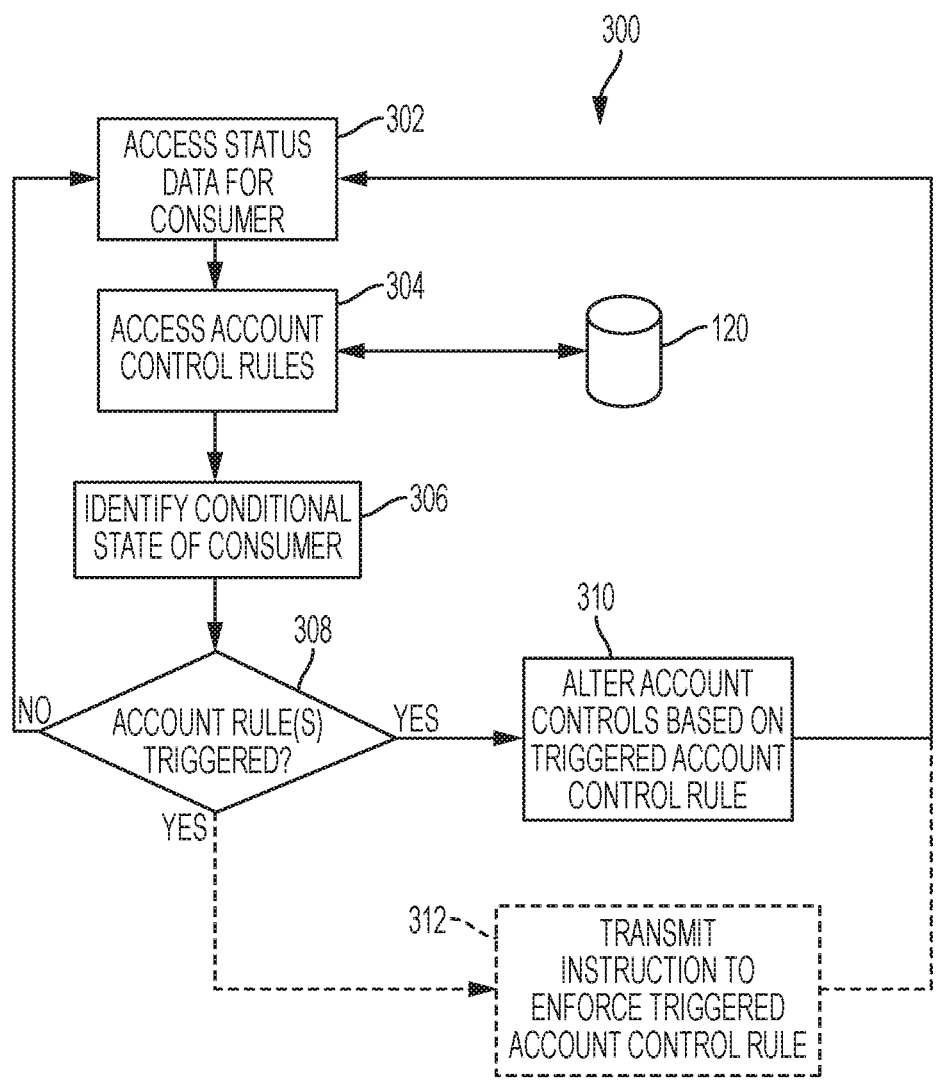
FIG. 3 is an exemplary method, which may be implemented in connection with the system of FIG. 1, for implementing the account controls for the account associated with the user.

FIG. 3 illustrates an exemplary method 300 for use in implementing controls for a payment account associated with a user based on conditional states of the user. The exemplary method 300 is described as implemented in the account control engine 118 of system 100. However, it should be understood that the method 300 is not limited to this configuration, as the method 300 may be implemented in other parts of the system 100, for example, in other ones of the computing devices 200 in system 100, etc., or in multiple other computing devices. As such, the methods herein should not be understood to be limited to the exemplary system 100 or the exemplary computing device 200, and likewise, the systems and the computing devices herein should not be understood to be limited to the exemplary method 300.

As shown in FIG. 3, the account control engine 118 initially accesses status data for the consumer 112, via the communication devices 114, 116 associated with the consumer 112, at 302. In so doing, the communication devices 114, 116 (and/or the corresponding monitoring applications) may push the status data to the account control engine 118, or the account control engine may pull the status data therefrom, as desired. In any case, the account control engine 118 may access all available status data, or it may be limited, via permission provided by the consumer 112, to only particular status data. For example, the consumer 112 may specify the particular data to be accessed, if any, in connection with registering one or more of the payment network 106, the issuer 108, and/or the account control engine 118 for various services (e.g., fraud control services, etc.), or as particular setting feature(s) associated with the corresponding monitoring applications at the communication devices 114, 116, etc.

In some embodiments, the account control engine 118 may subsequently access status data from the communication devices 114, 116 to update the data, as appropriate herein. In addition, the data access may be done continuously or periodically at desired regular or irregular intervals. In some embodiments, the account control engine 118 may receive status data only when the values change substantially from a previously gathered values. In this way, the account control engine 118 assumes that, when it has not received a new value, the status data has not changed substantially and the engine 118 reacts accordingly.

At about the same time, or before or after, the account control engine 118 also accesses the account control rules for the consumer 112 (and particularly for the consumer's payment account) from the data structure 120, at 304. As described in connection with the system 100, the data structure 120 includes various account control rules for the consumer's payment account, that relate to (or are associated with) different conditional states of the consumer 112. In some embodiments, the data structure 120 may also include account control rules for the consumer's payment account that are independent of conditional states of the consumer 112 (and that may be implemented by the account control engine 118 based on other reasons, for example, spending activity of the consumer 112, etc.).

Next in the method 300, the account control engine 118 identifies a conditional state for the consumer 112 based on the accessed status data, at 306. In so doing, the account control engine 118 may directly determine the conditional state of the consumer 112, based on the accessed status data. For example, as described in connection with the system 100, the account control engine 118 may assess the status data for the consumer 112 by comparing it to various thresholds stored in memory of the engine 118. Alternatively, the account control engine 118 may identify the conditional state of the consumer 112 by receiving it from, for example, one of the consumer's communication devices 114, 116 and/or associated monitoring applications. Here, the communication devices 114, 116 (e.g., via the monitoring applications, etc.) may assess the status data for the consumer 112 by comparing it to various predefined thresholds stored in memory of the devices 114, 116 and/or thresholds associated with the monitoring applications.

The account control engine 118 then determines, at 308, if one (or multiple ones) of the account control rules for the consumer 112 is triggered, based on the identified conditional state. In particular, the account control engine 118 determines if any of the account control rules, accessed at 304, are associated with the particular conditional state for the consumer 112 identified at 306.

When the account control engine 118 determines that an account control rule for the consumer 112 is triggered, at 308, it activates (or enforces) the particular rule and implements the corresponding account control. In particular, the account control engine 118 alters and/or updates the account controls for the consumer's payment account according to the triggered account control rule, at 310. Then, if the triggered account control rule requires suspension of the account or limitations on what may be purchased with the account, for example, the account control engine 118, as disposed along path A in the system 100, may consider the account control rule as a transaction associated with the consumer's payment account is processed in the system 100 and, if it violates the triggered account control rule, the account control engine 118 may reject the transaction to enforce the rule (or notify the payment network 106 and/or issuer 108 to reject the transaction). The account control rule may remain in effect until additional status data is again accessed for the consumer, at 302, and a change in conditional state for the consumer 112 is identified at 306.

Alternatively in the method 300, as indicated by the broken lines in FIG. 3, in determining that an account control rule for the consumer 112 is triggered, at 308, the account control engine 118 may transmit, at 312, an instruction to the payment network 106 and/or the issuer 108 regarding the conditional state of the consumer 112 and/or the implicated account control rule, and the payment network 106 and/or the issuer 108 may then enforce the rule and related control. Then, if the triggered account control rule requires suspension of the account or limitations on what may be purchased with the account, for example, the payment network 106 and/or the issuer 108 may consider the account control rule when processing transaction associated with the payment account. If a transaction violates the triggered account control rule, the payment network 106 and/or the issuer 108 may then reject the transaction to enforce the rule. The account control rule may remain in effect until additional status data is again accessed for the consumer, at 302, and a change in conditional state for the consumer 112 is identified at 306.

Finally in the method 300, when an account control rule is not triggered, at 308, the account control engine 118 remains idle until additional status data is again accessed for the consumer, at 302.

As an example application of the method 300, the account control engine 118 may receive heart rate data, respiratory rate data, and/or body temperature data for the consumer 112, at 302, and also access (or filter, etc.) account control rules for the consumer's payment account, at 304, from the data structure 120. The account control engine 118 may then analyze the heart rate data, respiratory rate data, and/or body temperature data against various thresholds, and identify that the consumer 112 exercising, at 306. For example, the heart rate data, respiratory rate data, and/or body temperature data may all be above corresponding thresholds, etc. In this example, the account control engine 118 may receive the heart rate data, respiratory rate data, and/or body temperature data at regular intervals, via the consumer's communication devices 114, 116, and may monitor the data for any changes that may indicate the consumer 112 is done exercising and/or may be identified with a different conditional state.

In turn in this example, at 308, the account control engine 118 identifies a rule that limits the categories of merchants from whom products can be purchased via the consumer's payment account to gyms or other exercise-related facilities. The rule takes into account that, when exercising, the consumer 112 is unlikely to make certain kinds of purchases with the payment account. As such, if those kinds of purchases are attempted, it is more likely that they are fraudulent. For instance, if the consumer 112 is exercising, he/she is unlikely to purchase gasoline or clothes from an online merchant. However, the consumer 112 may purchase a drink or food from the location at which they are exercising, etc.

Then, the account control engine 118 sends instructions to the issuer 108 to enforce the triggered account control rule, at 312. In response, the issuer 108 may suspend categories of purchases which are not likely to be legitimate when the consumer 112 is exercising, consistent with the triggered rule. The account control rule remains in effect until the account control engine 118 determines that the consumer has stopped exercising. For example, when the account control engine 118 determines that the consumer has stopped exercising, based on the heart rate data, respiratory rate data, and/or body temperature data received for the consumer 112, at 306, the account control engine 118 may send further instructions to the issuer 108 to stop enforcement of the rule. The instructions may also identify one or more additional rules to be enforced, based on the subsequent conditional state of the consumer.

As another example, the communication device 116 (e.g., having at least part of the account control engine 118 incorporated therein or associated therewith, etc.) may analyze status data for the consumer 112 such as heart rate data, respiratory rate data, body temperature data, and/or movement data, and compare the data to various thresholds stored in memory 204. In so doing, the communication device 116 may identify that the consumer 112 is in a particular conditional state, for example, a sleeping state (e.g., the heart rate data, respiratory rate data, body temperature data, and/or movement data for the consumer 112 may all be below corresponding thresholds, etc.).

At this time (or earlier or later), the communication device 116 may also access (or filter, etc.) account control rules for the consumer's payment account, at 304, from the data structure 120. In turn, at 308, the communication device 116 may identify a rule that suspends all transactions to the consumer's payment account, while the consumer is asleep.

Then, the communication device 116 sends instructions to the issuer 108 to enforce the triggered account control rule, at 312. In response, the issuer 108 may suspend all transactions to the consumer's payment account, consistent with the triggered rule. The account control rule remains in effect until the communication device 116 determines that the consumer is awake. For example, when the communication device 116 determines that the consumer is awake, based on the heart rate data, respiratory rate data, body temperature data, and/or movement data received for the consumer 112, at 306, the communication device 116 may send further instructions to the issuer 108 to stop enforcement of the rule. The instructions may also identify one or more additional rules to be enforced, based on the subsequent conditional state of the consumer.

In addition in this example, when the status data for the consumer 112 indicates that the consumer 112 is asleep, the communication device 116 may determine if the consumer 112 was previously asleep at a prior predefined time interval. This may be done as a check to determine whether the consumer 112 has recently awoken. If the consumer 112 was not previously asleep, the communication device 116 may return to monitoring the consumer 112. Further, if the consumer 112 was previously asleep, the communication device 116 may wait for a time interval (e.g., 5 minutes, 15 minutes, 1 hour, etc.) to ensure that the indicated waking is not a false positive and to avoid multiple changes in rules within a given period.

In this example, the communication device 116 may receive the heart rate data, respiratory rate data, body temperature data, and/or movement data at regular intervals, and may monitor the data for any changes that may indicate the consumer 112 is waking up. The communication device 116 may then communicate the updated data to the account control engine 118, as appropriate.

In some embodiments, one of the communication devices 114, 116 may include a microphone and may be configured to monitor the microphone for stress in the consumer's voice, as status data relating to the consumer 112. Such audible status data may be used in combination with other status data, such as heart rate, for the consumer 112 to differentiate an exercise conditional state from a fear-based conditional state (such as a mugging). Further yet, one of the communication devices 114, 116 may be configured to monitor the microphone for particular words suggesting that particular events are occurring (e.g., a mugging or other crime, other events, etc.).

In some embodiments, one of the communication devices 114, 116 may include smart glasses, and may be configured to monitor images from the smart glasses or other visual cues that can be transmitted to the account control engine 118. As previously described, in these embodiments a presumption may be made that, in order for the consumer 112 to purchase a product, the consumer 112 must be looking at the product or a representation thereof. As such, if the visual cue does not match a current transaction, at the same time, the account control engine 118 may trigger an account rule to either deny the transaction or request additional verification.

In some embodiments, the consumer 112 may be allowed to override a conditional state identified by the communication devices 114, 116 and/or the account control engine 118. For example, the consumer 112 wake up and immediately think of something he/she would like to purchase online, but the communication devices 114, 116 have not yet transitioned to an awake state. Here, the consumer 112 may input an override instruction to one of the communication devices 114, 116 indicating that the consumer 112 is indeed awake (or to transition from a sleeping state to a default state, etc.). This feature could also be used to override a stressed conditional state or a conditional state of duress where such state is being caused by a non-threat event (e.g., the consumer 112 is running late for an appointment or is at a hospital with a loved one, etc.).

In view of the above, the systems and methods herein may permit payment networks and/or account issuers to alter account controls based on status data gathered from consumers associated with the payment accounts. The account controls may be altered in such a way to help protect the payment accounts from fraudulent activity during times when the consumers are unlikely to make certain purchases.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving status data for a user, the status data indicative of a current conditional state of the consumer; (b) accessing at least one account control rule for an account associated with the user, the at least one account control rule associated with a conditional state; and (c) activating the at least one account control rule when the current conditional state of the user is the same as the conditional state associated with the at least one account control rule.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in modifying account controls for an account associated with a user based on a conditional state of the user, the method comprising:
    receiving, by a payment network computing device, status data for a user over a network from a wrist wearable device associated with the user, the status data indicative of a current sleeping state of the user, the wrist wearable device including at least one accelerometer, wherein the status data is determined based, at least in part, on movement data for the user obtained from the at least one accelerometer;
    accessing, by the payment network computing device, at least one account control rule for an account associated with the user, the at least one account control rule associated with a sleeping state, wherein the at least one account control rule indicates the account is disabled for at least one type of transaction while enabled for at least another recurring transaction;
    activating, by the payment network computing device, the at least one account control rule when the current sleeping state of the user satisfies at least one threshold of the sleeping state included in the at least one account control rule and causing a suspension of the account associated with the user with respect to purchases involving the at least one type of transaction;
    receiving, by the payment network computing device, an authorization request for a transaction to the account associated with the user; and
    when the transaction is for the at least one type of transaction, declining, by the payment network computing device, the transaction based on the current sleeping state of the user.

2. The computer-implemented method of claim 1, wherein activating the at least one account control rule includes instructing, by the payment network computing device, another computing device to alter at least one account control for the account and to suspend the account associated with the user with respect to purchases involving the at least one type of transaction.

3. The computer-implemented method of claim 2, wherein the another computing device is associated with an issuer of the account.

4. The computer-implemented method of claim 1, wherein the wrist wearable device includes at least one heart rate sensor configured to monitor a heart rate of the user; and
    wherein the current sleeping state is determined further based on heart rate data for the user obtained from the at least one heart rate sensor.

5. The computer-implemented method of claim 1, wherein the status data further includes data relating to at least one of a respiratory rate and/or a temperature.

6. The computer-implemented method of claim 1, further comprising analyzing, by the payment network computing device, the received status data to determine the current sleeping state of the user.

7. The computer-implemented method of claim 6, wherein analyzing the received status data includes comparing the received status data to at least one threshold defined in the at least one account control rule, to determine the current sleeping state of the user.

8. A system for use in implementing account controls based on conditional states of a user, the system comprising:
    a memory configured to store account control rules for a payment account associated with a user, the account control rules each including an account control and a threshold for at least one conditional state of the user to trigger the account control, the user associated with a wrist wearable device, the wrist wearable device including at least one accelerometer and/or at least one heart rate sensor; and
    at least one processor in communication with the memory, the at least one processor configured to:
    access status data for the user;
    identify a conditional state for the user based, at least in part, on the status data, the status data based, at least in part, on movement data from the at least one accelerometer and/or heart rate data from the at least one heart rate sensor, the conditional state including one of: a sleeping state and an exercise state;
    access the account control rules in the memory;
    determine whether the threshold of one or more of the account control rules is satisfied by the identified conditional state of the user; and
    activate at least one of the one or more of the account control rules for the payment account associated with the user when the identified conditional state for the user satisfies the threshold of the at least one of the one or more of the account control rules and cause a suspension of the payment account associated with the user in accordance with the at least one of the one or more account control rules, thereby enabling a decline of one or more authorization requests involving the payment account associated with the user based on the movement data for the user.

9. The system of claim 8, wherein the at least one processor is further configured to alter the account control for said activated at least one of the one or more of the account control rules for the payment account.

10. The system of claim 8, wherein the at least one processor is further configured to, in connection with activating the at least one of the one or more account control rules, transmit an instruction to at least one of a payment network associated with processing transactions to the payment account and an issuer of the payment account to alter the account control for at least one of the account control rules for the payment account based on the activated at least one of the one or more of the account control rules.

11. The system of claim 8, further comprising the wrist wearable device associated with the user, the wrist wearable device configured to collect status data for the user using the at least one accelerometer and/or the at least one heart rate sensor; and wherein the at least one processor is configured, in connection with accessing the status data for the user, to receive the status data from the wrist wearable device associated with the user via a network connection.

12. The system of claim 11, wherein the wrist wearable device is configured to determine the conditional state for the user based on the collected status data; and wherein the at least one processor is further configured, in connection with identifying the conditional state for the user, to receive the determined conditional state from the wrist wearable device.

13. The computer-implemented method of claim 1, wherein receiving the status data from the wrist wearable device includes receiving the status data from the wrist wearable device via at least one of: a communication device associated with the user; a web-based monitoring application associated with the wrist wearable device; and/or a web-based monitoring application associated with the communication device.

14. The system of claim 8, wherein the at least one processor is configured to, in connection with accessing the status data, receive the status data from the wrist wearable device via at least one of: a communication device associated with the user; a web-based monitoring application associated with the wrist wearable device; and/or a web-based monitoring application associated with the communication device.

\* \* \* \* \*